US007266768B2

(12) United States Patent
Ferlitsch et al.

(10) Patent No.: US 7,266,768 B2
(45) Date of Patent: Sep. 4, 2007

(54) SYSTEMS AND METHODS FOR MANIPULATING ELECTRONIC INFORMATION USING A THREE-DIMENSIONAL ICONIC REPRESENTATION

(75) Inventors: Andrew Rodney Ferlitsch, Tigard, OR (US); Darwin Alan DeVore, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 942 days.

(21) Appl. No.: 09/757,342

(22) Filed: Jan. 9, 2001

(65) Prior Publication Data

US 2002/0091739 A1    Jul. 11, 2002

(51) Int. Cl.
*G06F 17/00*    (2006.01)
(52) U.S. Cl. ..................................... 715/526
(58) Field of Classification Search ............... 715/515, 715/522, 526, 514, 775, 835–839, 848, 976–978; 345/775, 326–358, 836, 839, 848, 976–978
See application file for complete search history.

(56) References Cited

U.S. PATENT DOCUMENTS

| | | | | |
|---|---|---|---|---|
| 5,060,135 A | | 10/1991 | Levine et al. ............... 364/200 |
| 5,303,388 A | * | 4/1994 | Kreitman et al. ........... 345/836 |
| 5,499,330 A | | 3/1996 | Lucas et al. ................. 395/145 |
| 5,621,874 A | * | 4/1997 | Lucas et al. ................. 715/500 |
| 5,751,287 A | | 5/1998 | Hahn et al. ................. 345/351 |
| 5,905,992 A | | 5/1999 | Lucas et al. ................. 707/514 |
| 5,923,325 A | * | 7/1999 | Barber et al. ............... 715/711 |
| 5,943,679 A | | 8/1999 | Niles et al. .................. 707/526 |
| 6,009,442 A | | 12/1999 | Chen et al. .................. 707/522 |
| 6,012,072 A | * | 1/2000 | Lucas et al. ................. 715/526 |
| 6,026,416 A | | 2/2000 | Kanerva et al. ............ 707/515 |
| 6,081,817 A | * | 6/2000 | Taguchi ....................... 715/526 |
| 6,262,732 B1 | * | 7/2001 | Coleman et al. ............ 715/835 |
| 6,310,633 B1 | * | 10/2001 | Graham ....................... 715/839 |
| 2002/0067378 A1 | * | 6/2002 | Abdelhadi et al. .......... 345/836 |
| 2002/0067380 A1 | * | 6/2002 | Graham ....................... 345/838 |
| 2004/0128277 A1 | * | 7/2004 | Mander et al. ................ 707/1 |

FOREIGN PATENT DOCUMENTS

JP    10-124489    5/1998
JP    2000-105772    4/2000

OTHER PUBLICATIONS

Microsoft® Windows NT, version 4.0 ("Microsoft"),© 1981-1999 Microsoft Corp.*
Vaillancourt, Alain,"Generated Glyphs as Memorable Desktop Icons for Documents",ACM, 2000, pp. 9-12.*

* cited by examiner

*Primary Examiner*—Doug Hutton
*Assistant Examiner*—James Debrow
(74) *Attorney, Agent, or Firm*—Krieger Intellectual Property, Inc.; Scott C. Krieger

(57) ABSTRACT

Embodiments of the present invention relate to methods and systems for editing, creating and modifying documents through the use of multiple function icons in a graphical user interface environment. Icons comprising a series of object images may represent documents and the pages thereof. Manipulation of the object images and their parts through user input with a pointing device or other input device causes document modification to occur.

20 Claims, 10 Drawing Sheets

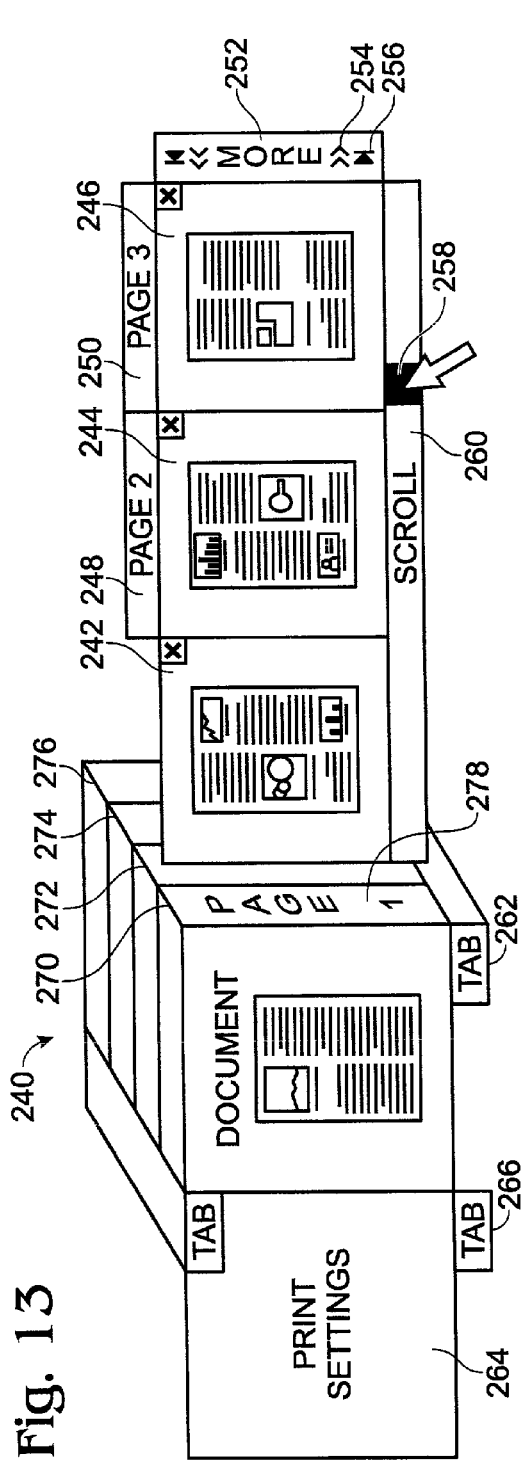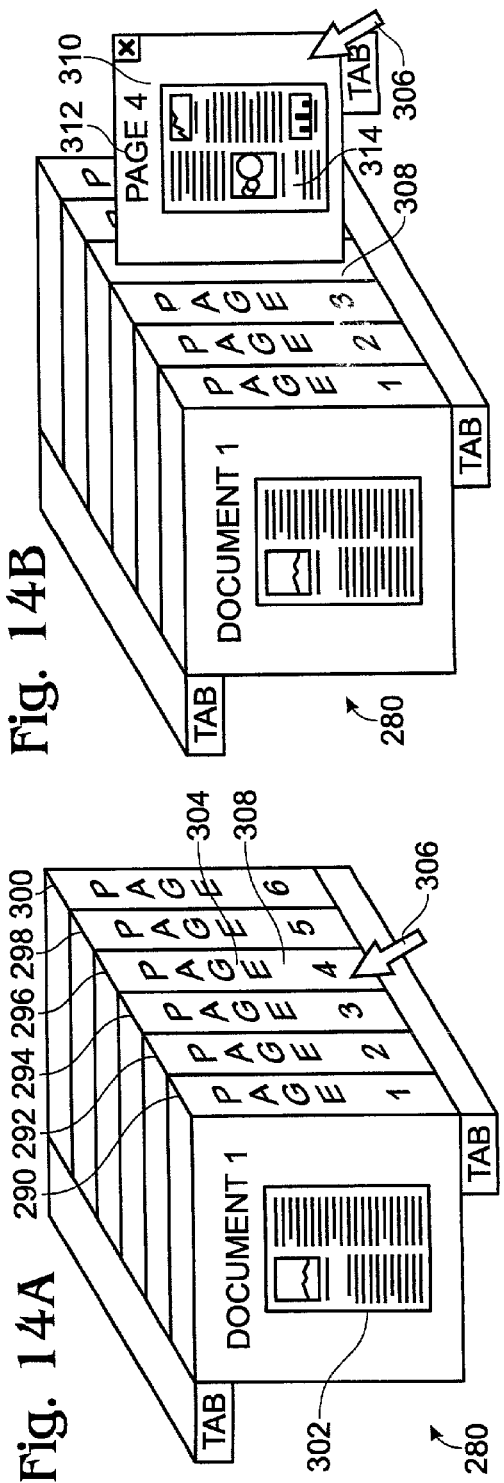

SYSTEMS AND METHODS FOR MANIPULATING ELECTRONIC INFORMATION USING A THREE-DIMENSIONAL ICONIC REPRESENTATION

THE FIELD OF THE INVENTION

Embodiments of the present invention relate to methods and systems for modification of digital documents through the use of a novel icon which represents the pages of a document as one or more "three-dimensional" object images in adjacent orientation such as an offset stack. Manipulation of the object image icon with a pointing device results in modification of the associated document.

BACKGROUND

Interaction between computers and users has been facilitated through the use of graphical user interfaces (GUIs) which allow a user to manipulate icons on a computer display to communicate commands to the computer. Icons are typically manipulated with a pointing device which may be used to select, move and otherwise manipulate icons or portions thereof through various clicking, dragging, dropping and similar actions.

Icons may be tailored to visually represent the applications to which they are associated or various functions thereof. Generally, an icon's visual representation is designed to invoke a pre-disposed association between the icon and the associated application. For example, an icon depicting a pen or sheet of paper may be associated with a word processing application, an icon depicting a grid may be associated with a spreadsheet application or an icon depicting a painter's palette or brush may be associated with a graphics program.

Icons may also be tailored to represent documents. An example of this is the ubiquitous "thumbnail" icon which is a miniature or reduced image of a page of the document or file itself. This thumbnail icon scheme may be used to represent graphics files as well as text, spreadsheet or other documents. Users familiar with the documents can easily distinguish one icon from another and select the desired document. Known thumbnail icon methods work well with single-page documents when the thumbnail is an accurate representation of the entire document, however these methods fall short when used with multiple-page documents where multiple page identification and modification are advantageous.

Some GUI methods employ multiple-page icons which represent each page of a document in an offset stack or pile. These methods utilize an icon which offers a full, though reduced size, view of one page of a document at the top of a stack and a partial view of the edges of succeeding pages lower in the stack. These methods allow for limited manipulation and viewing of pages by known point and click techniques. Document pages may be brought to the top of the stack by selection of their edges and pages may be viewed once they are brought to the top of the stack by selection of the top page.

While these multi-page icon methods offer some utility in viewing and ordering a document, their limited functionality precludes complex modification of documents. A method and system which provides for complex page ordering, file creation, page deletion and organizational and functional aids through an intuitive, multi-page icon would be advantageous.

SUMMARY AND OBJECTS OF THE INVENTION

Embodiments of the present invention provide methods and systems for document organization and modification through the use of intuitive, multi-page capable icons. Documents and their pages may be viewed, listed, accessed, organized, added to, deleted, printed and otherwise modified and configured through manipulation of multi-function, multi-page capable icons.

Embodiments of the present invention comprise a multi-function icon in a graphical user interface environment. The icon represents a document and comprises a series of three-dimensional object images with each image representing a page or group of pages in a document. The series of images is arranged in an offset order such that each object image may be seen and selected by a user. Some embodiments comprise a series of images arranged in an offset stack with one or more edges of each object available for selection. The size of the stack and number of pages represented at one time by the icon may be adjusted for user and display conditions.

The icon of embodiments of the present invention may also comprise function tabs which are connected to each object and which enable specific functions or menus when selected. In preferred embodiments, function tabs may activate print configuration menus, file properties displays or other document-related functions.

Accordingly, it is an object of some embodiments of the present invention to provide systems and methods for more efficient and convenient document management and organization.

It is another object of some embodiments of the present invention to provide systems and methods for document modification.

These and other objects and features of the present invention will become more fully apparent from the following, description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 13 shows an embodiment of the present invention displaying multiple page images in an adjacent series configuration while displaying a print properties sheet;

DETAILED DESCRIPTION OF THE PREFERRED EMBODIMENTS

The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the system and apparatus of the present invention, as represented in FIGS. 1 through 15E is not intended to limit the scope of the invention, as claimed, but it is merely representative of the presently preferred embodiments of the invention.

The currently preferred embodiments of the present invention will be best understood by reference to the drawings, wherein like parts are designated by like numerals throughout.

The term "icon" as used in this document may refer to any symbol, representation or image that is displayable on a general purpose or special purpose computing device display.

Figure 1:
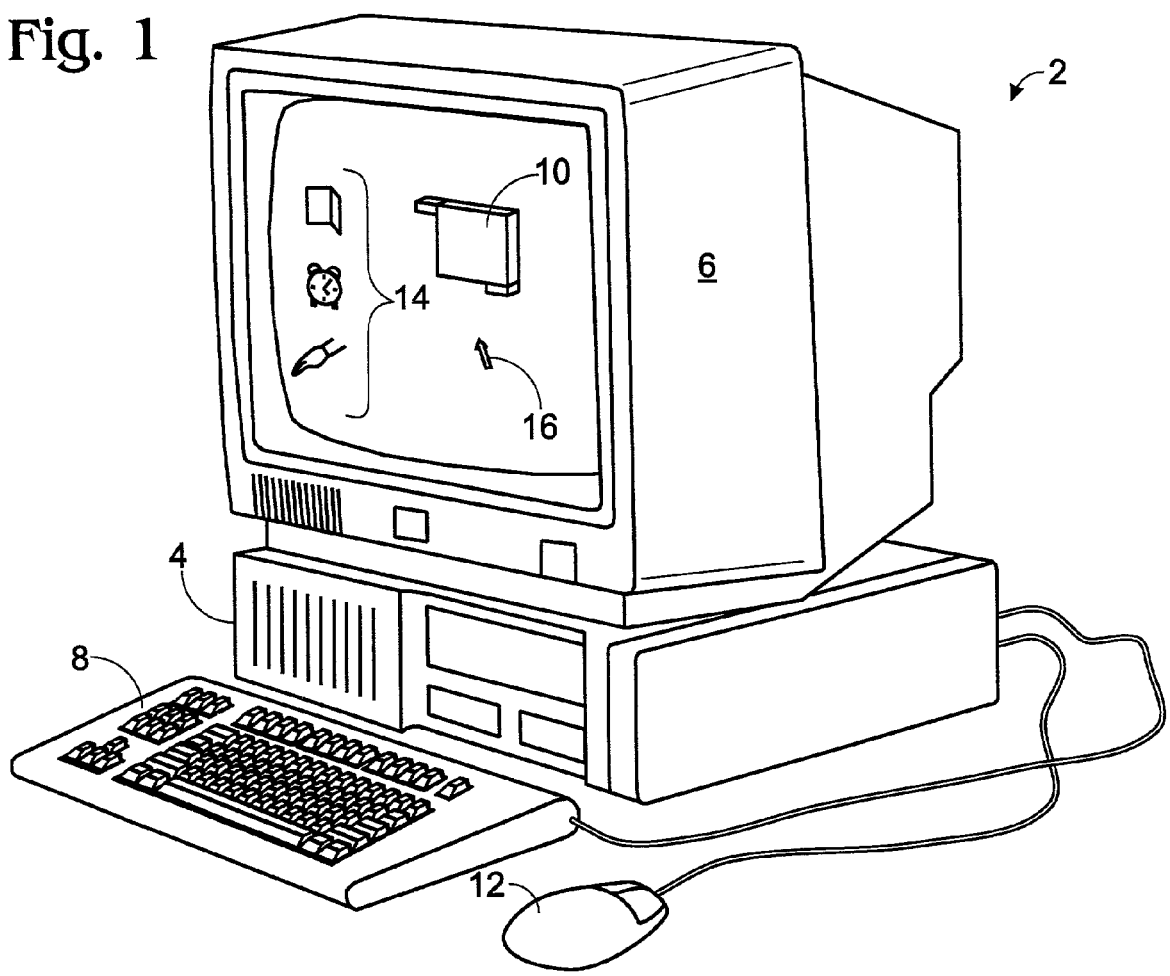
FIG. 1 is a diagram of a typical computer system used in conjunction with embodiments of the present invention.
Figure 3:
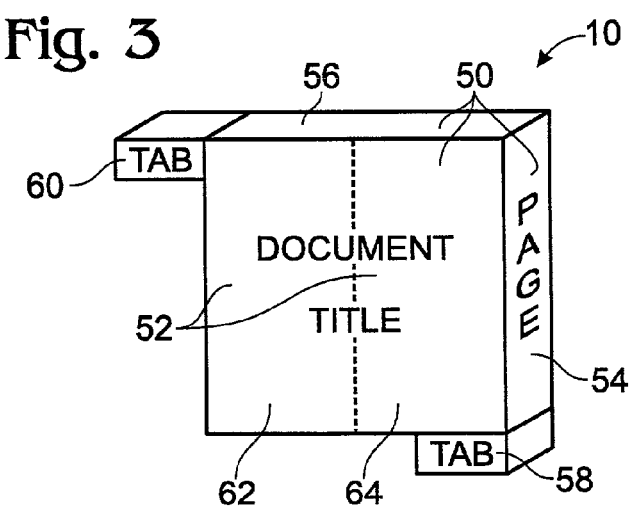
FIG. 3 shows an object image and associated elements of an exemplary embodiment of the present invention.

In reference to FIG. 1, embodiments of the present invention comprise systems and methods of document manipulation using icons or visual references in conjunction with a computer system 2. Computer system 2 may comprise a processing unit 4 connected to a display 6, such as a video monitor or LCD display, on which information is displayed to a user. System 2 may also comprise input devices, such as a keyboard 8 and pointing device 12 used to communicate with system 2 and processing unit 4. System 2 also comprises a graphical user interface (GUI) which allows for the display of icons 14 which may be selected by a user through user input via input devices 8 and 12. Known GUIs typically use a mouse or pointer input device 12 to orient a cursor pointer 16 over an icon or portion thereof while making an input device selection such as a mouse or pointer click, double-click or similar input. Most GUI's also support common drag-and-drop operations and other input techniques known in the art.

Figure 2:
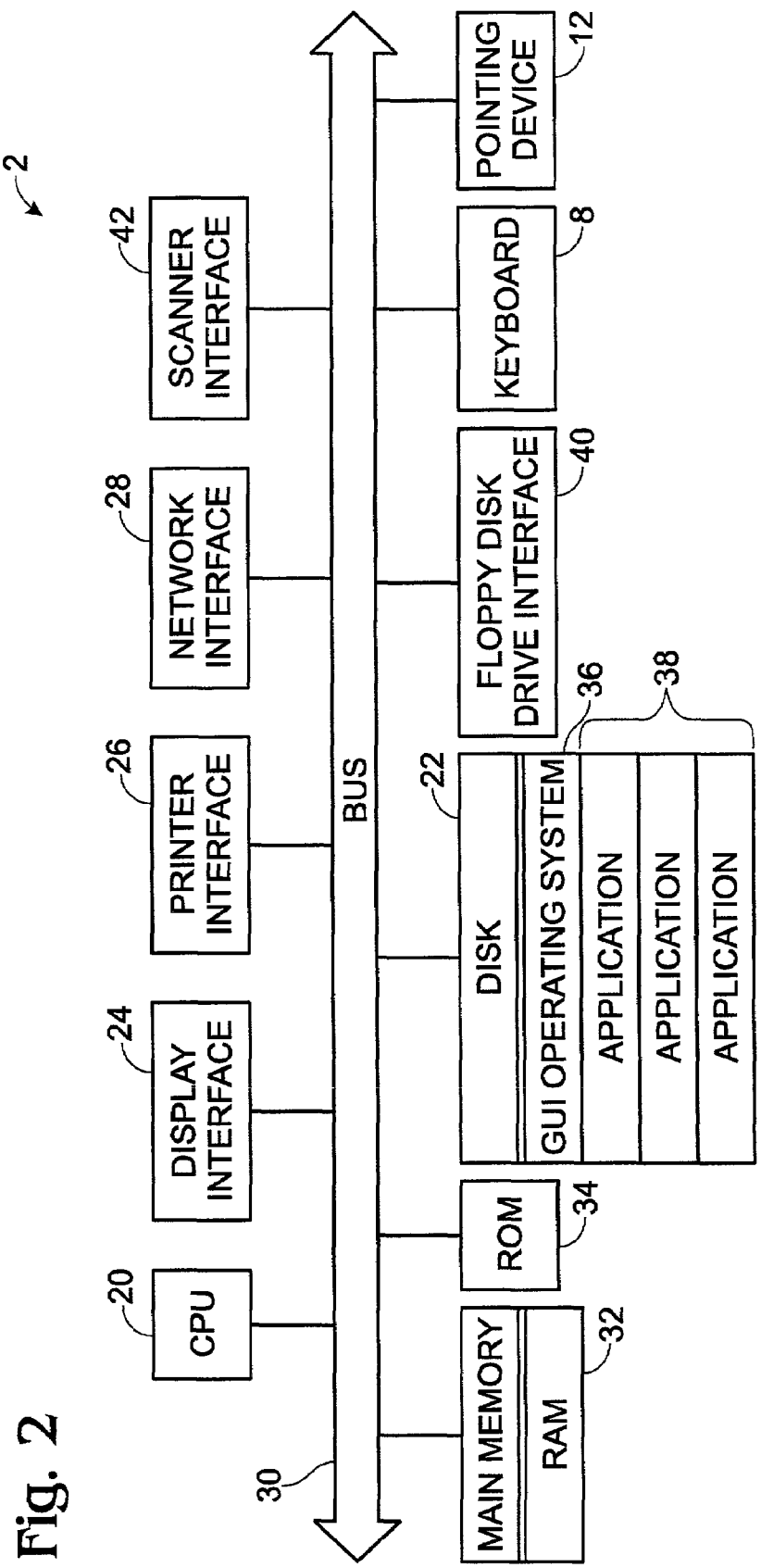
FIG. 2 is a diagram showing the various components of a client computer or workstation used in conjunction with embodiments of the present invention.

The architecture of an exemplary computer system 2 may be seen with reference to FIG. 2, which shows a block diagram of system components. While system components may vary widely and many elements may be used in conjunction with embodiments of the present invention, the exemplary embodiment shown in FIG. 2 is typical of a computer system 2 used in the art. System 2 comprises a CPU 20 in communication with a computer bus 30 which connects CPU 20 with other system components. Also connected to bus 30 is main memory 32 and read-only memory (ROM) 34. System 2 also comprises storage devices such as disk 22 which may be used to store an operating system 36, applications 38 and other data. In preferred embodiments of the present invention, operating system 36 will incorporate a GUI.

Some systems may also comprise other storage devices, such as a floppy-disk drive 40, CD-ROM drive, DVD drive or similar devices. Input devices such as keyboard 8 and pointing device 12 may also be connected to bus 30 for communication with CPU 20. System 2 also comprises a display interface 24 for connection with display 6 thereby enabling input through GUI operating system 36. Some embodiments may further comprise printer interface 26, network interface 28, scanner interface 42 and other connections and interfaces for peripheral devices or other components.

Embodiments of the present invention comprise a multi-function icon 10, as shown in FIG. 1, which is displayed on a computer display 6 for selection and manipulation by a user via an input device 12, such as a mouse. In some embodiments, icon 10, shown in more detail in FIG. 3, comprises an object image 50 having a face 52 and at least one edge, such as side edge 54 or top edge 56, which is made visible to a user on display 6. Some embodiments may further comprise function tabs, such as bottom tab 58 and side tab 60. The particular embodiment shown in FIG. 3 utilizes a cubic-shaped object image which is intuitive because it approximates the shape of a page, photograph or other element of common print media.

Edges 54 and 56, face 52, and function tabs 58 and 60 may comprise active regions which are programmed to perform specific functions upon user selection with an input device such as pointing device 12. Active regions may cover an entire tab, face or edge or a specific portion thereof. As a non-limiting example, icon 10 may comprise a side edge 54 which is programmed to perform a specific function when a user selects any position on side edge 54 and a face 52 which is subdivided into a left active region 62 and a right active region 64 wherein left active region 62 may be programmed to perform a first function and right active region 64 may be programmed to perform a second function. Other variations in active region geometry and configuration may be used in embodiments of the present invention.

Figure 4:
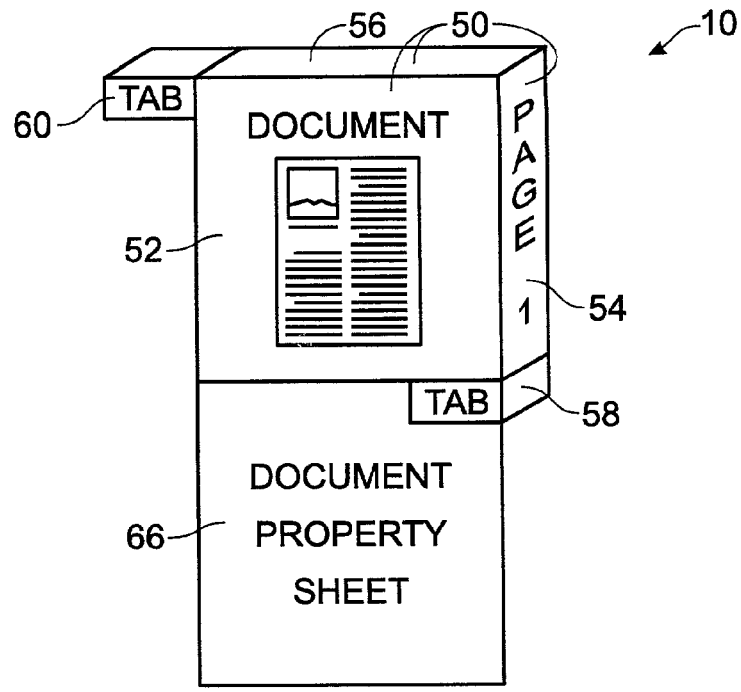
FIG. 4 shows an object image and document property sheet of an embodiment of the present invention.

In reference to FIG. 4, an exemplary function assigned to an active region on function tab 58 may be explained. User input via selection of function tab 58 may activate an information sheet function which displays document property sheet (DPS) 66. DPS 66 may comprise text or other indicia which communicate one or more properties of a document. As an example, DPS 66 may communicate the number of pages in a document, the document author, document revision date, document creation date, document modification dates, page size, page orientation, document format and other properties of a document. DPS 66 may be configured to appear as an image of a sheet of paper or similar media on which the property information is displayed. In some embodiments, as shown in FIG. 4, DPS 66 appears as a sheet that projects from the bottom of icon 10 when function tab 58 is selected. Further selection of function tab 58 may deactivate DPS 66 and terminate its display.

Selection of various active regions on function tab 58 and DPS 66 may modify, filter or otherwise change the display of information on DPS 66.

Figure 5:
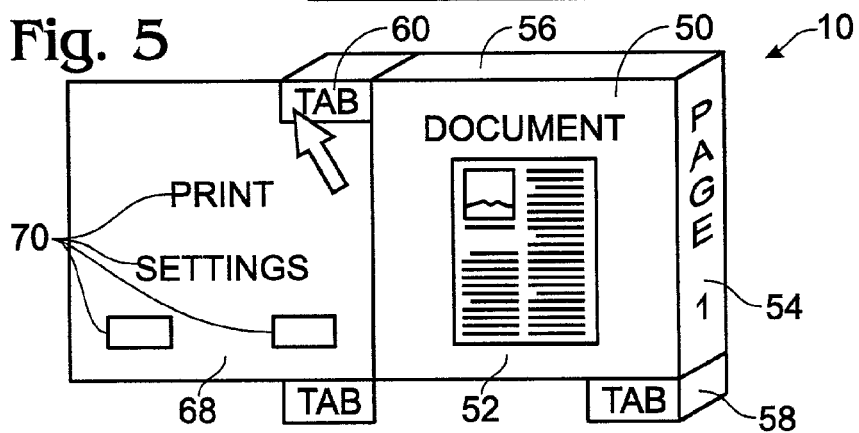
FIG. 5 shows an object image and print settings sheet of an embodiment of the present invention.

Another exemplary information sheet function may be explained in reference to FIG. 5 wherein a print settings sheet (PSS) 68 is displayed protruding from a side of icon 10. PSS 68 may be activated by selection of an active region of function tab 60 or some other active region. Upon activation, PSS 68 appears as a sheet of media which displays print setting information 70. Print setting information 70 may communicate the type of printer currently selected, the type of print media selected, such as bond paper, legal paper, letterhead, etc., print preview functions or other printer related information. PSS 68 and other information sheet functions may comprise active regions, radio buttons, dialog boxes and other input methods for configuration, customization or other modification of document properties or other environmental factors.

Figure 6:
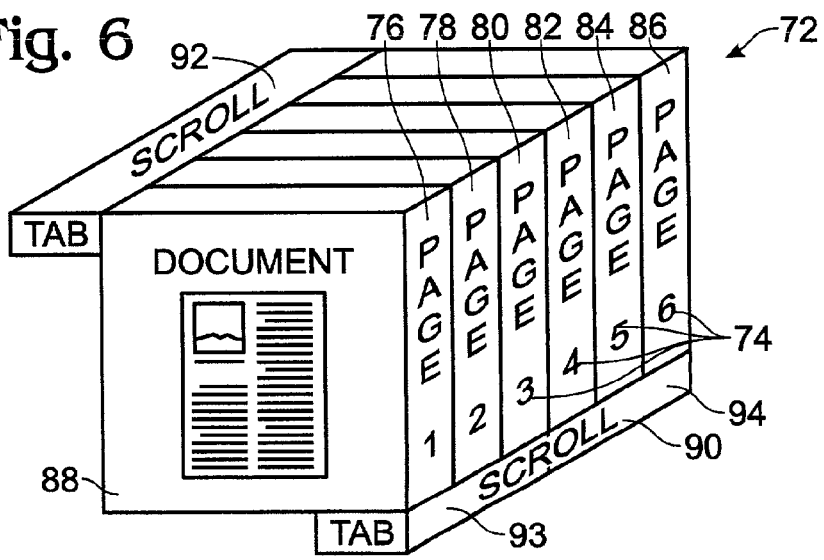
FIG. 6 shows a series of object images and associated elements of an embodiment of the present invention.

The inventive icons 10 of some embodiments of the present invention comprise the ability to expand in order to represent each page of a multiple page document. As shown in FIG. 6, an embodiment of icon 72 comprises multiple adjacent object images 76-86 with each object image 76-86 representing a page or group of pages or media elements in a document. As an example, icon 72 may represent a document with six pages or images with each page or image being represented as an object image. Alternatively, icon 72 may represent a document with more than six pages having only a portion of the document pages portrayed as object images at a time. Embodiments may accommodate a greater number of pages than object images through expansion of icon 72. This may be accomplished by dragging the rearmost object image 86 thereby expanding icon 72 through the addition of more object icons. Icon 72 may be expanded until it reaches the limits of a display. Icon 72 may also be retracted to limit the number of object elements by dragging rearmost object image 86 toward frontmost object image 76.

When the number of object images cannot be expanded to accommodate the number of pages or media elements in a document, embodiments of the present invention may allow manipulation of the entire range of media elements by scrolling the entire range of media elements through the range of object images. For example and not by way of limitation, a 20 page document may be represented with an icon 72 having only six visible object images. Each page of the 20 page document may be "scrolled" into the set of object images through the use of scroll bar 90. User input on scroll bar 90 may "scroll" the document pages through the object image set. Typically, page one of a document will be represented as frontmost object image 76 with consecutive pages 2-6 being represented by successive object images 78-86. However, subsequent pages 7-20 may be accessed by selection of scroll bar 90 which scrolls subsequent pages into object images 76-86.

Generally scroll bar 90 will be configured with active regions which allow for scrolling back and forth through the document pages. In an exemplary embodiment, scroll bar 90 will be divided into active regions 93 & 94 which enable scrolling in both directions. The rearmost portion 94 of scroll bar 90 enables scrolling subsequent pages into the available object images while the frontmost portion 93 of scroll bar 90 enables scrolling of preceding pages into the available object images. In this manner, when page one of a document is represented by frontmost object image 76, page seven of the document may be represented by selection of the rearmost portion 94 of scroll bar 90. This selection moves page one out of the object images while page two moves to the frontmost object image 76 and page seven moves into rearmost object image 86. Further selection of rear portion 94 of scroll bar 90 may move other subsequent pages into object images until the last document page is represented by rearmost object image 86. Similarly, preceding pages may be scrolled back into object images by selection of the frontmost portion 93 of scroll bar 90.

Figure 7:
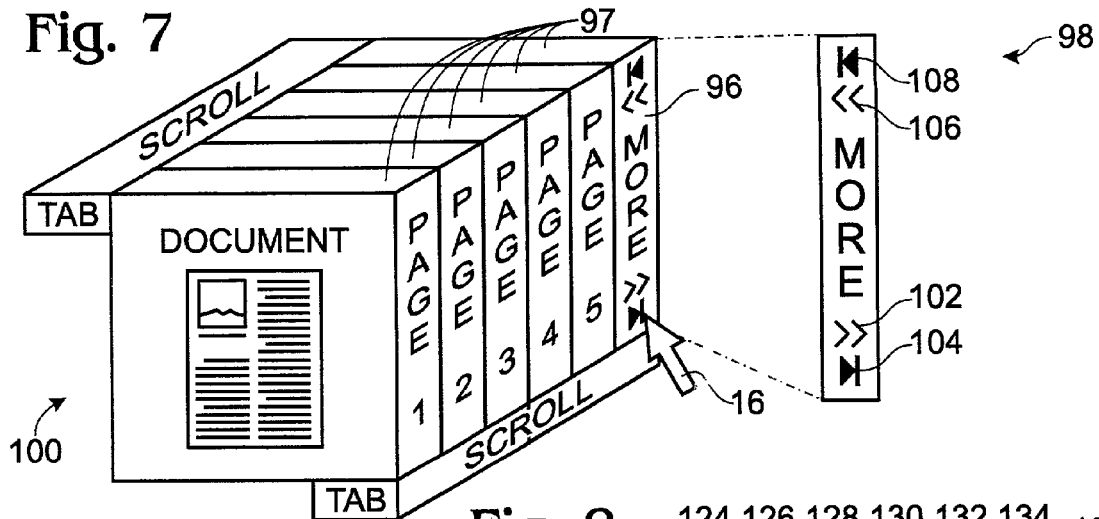
FIG. 7 shows an embodiment of the present invention with scrolling controls.

Other methods and configurations for scrolling pages into a limited set of object images may also be used in various embodiments of the present invention. As shown in FIG. 7, a document management icon 100 comprises a scroll object image 96 at the rear of an offset stack of object images 97. Scroll object image 96 may be located at other locations as well. An enlarged view 98 of scroll object image 96, shown at right in FIG. 7 reveals arrow symbols 102-108 located on active regions of image 96. Selection of these arrow symbols 102-108 activate various page scrolling functions. Arrow image 102 activates a function which scrolls forward into a document by one page similar to selection of scroll bar 90. Arrow image 106 activates a similar function which scrolls backward into a document by one page. Arrow images 104 and 108 may provide for automatic scrolling to the front or back of a document. Arrow images 102-108 may also be configured to activate multiple page scrolling wherein sets of pages are scrolled into the available object images in sets equal to the total number of object images or some other convenient number. Page scrolling may also be effectuated using an accelerated scrolling function wherein consecutive pages scroll into and progress through the object images as long as a symbol 102-108 or some other region is continuously selected. Scrolling speed may increase as the selection time increases thereby allowing easier navigation of large documents.

Figure 8:
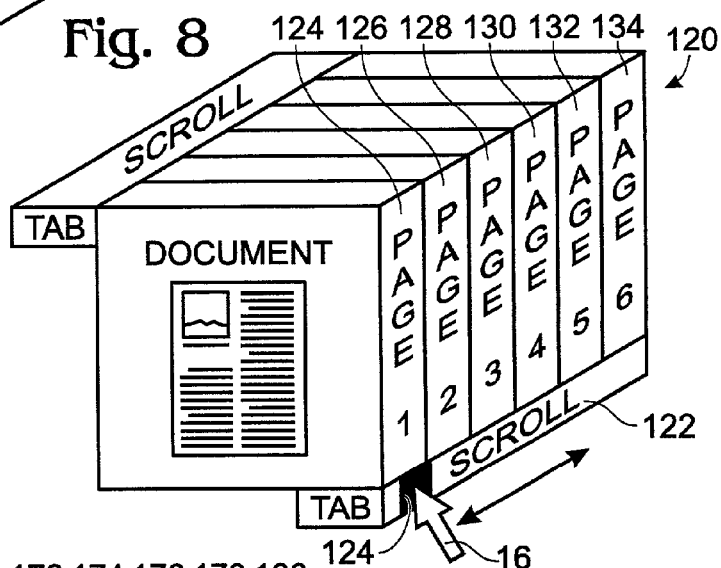
FIG. 8 shows an embodiment of the present invention with scroll bar functionality.

A further page or media-element scrolling feature may be adopted in some embodiments of the present invention as shown in FIG. 8 wherein a multiple function icon 120, comprises a slidable scroll bar 122 with a scroll tab 124 which can be dragged along scroll bar 122 to various positions along the length of scroll bar 122. The length of scroll bar 122 may represent the length of a document while the position of scroll tab 124 represents a page location within the document where the pages are represented by object images 124-134. Placing an input device cursor over scroll tab 124 and dragging scroll tab 124 backward or forward along scroll bar 122 causes document pages to scroll into and out of object images 124-134 thereby allowing a user to access each page of a document in a limited object image set.

Figure 9:
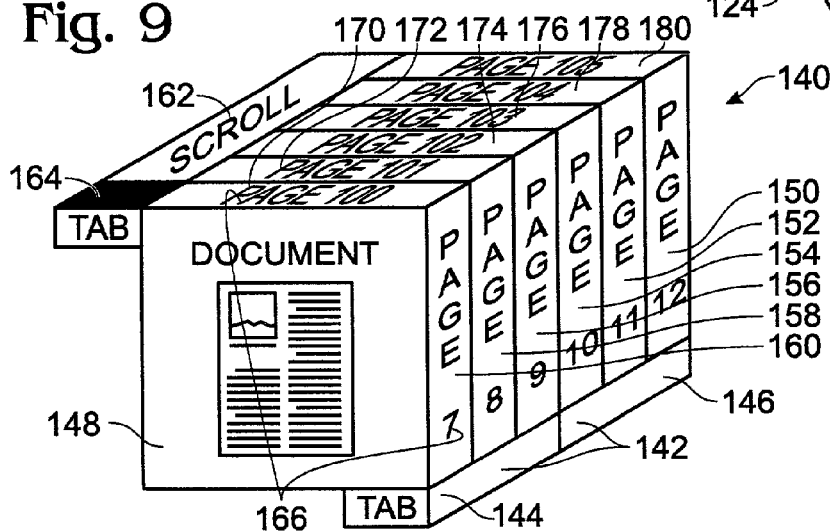
FIG. 9 shows an embodiment of the present invention with multiple scroll bar functionality.

Another embodiment of the present invention, shown in FIG. 9, comprises multiple scroll bars and multiple edges on object images which allow for independent scrolling and representation of multiple pages in a single object image. Multiple function icon 140 comprises a series of object images in an offset stack, each object image having a top edge 170-180 and a side edge 150-160. Each edge may further comprise page indicia 166 which identify which document page is represented by each object edge. In these embodiments, each edge 150-160 and 170-180 may represent a different document page. This method makes two sets of document pages available for manipulation. Edges 150-160 may represent one set of consecutive pages while edges 170-180 represent another set of consecutive pages at another location in the document.

As explained for earlier embodiments, when icon 140 represents a document which contains more pages than can be represented by the finite number of object images in icon 140, scroll bar 142 may be used to scroll a desired set of pages into edges 150-160. As a non-limiting example, scroll bar 142 may be used to bring document pages 7-12 into representation by edges 150-160. Similarly, scroll bar 162 may be used to bring document pages 100-105 into representation by edges 170-180. At this point edge indicia 166 will indicate on the appropriate edges which pages are represented by which edges and a user may select desired pages by clicking or other input device functions. In this manner two or more page ranges can be made accessible on a single icon 140 for page insertion, exchange or other functions.

Figure 10:
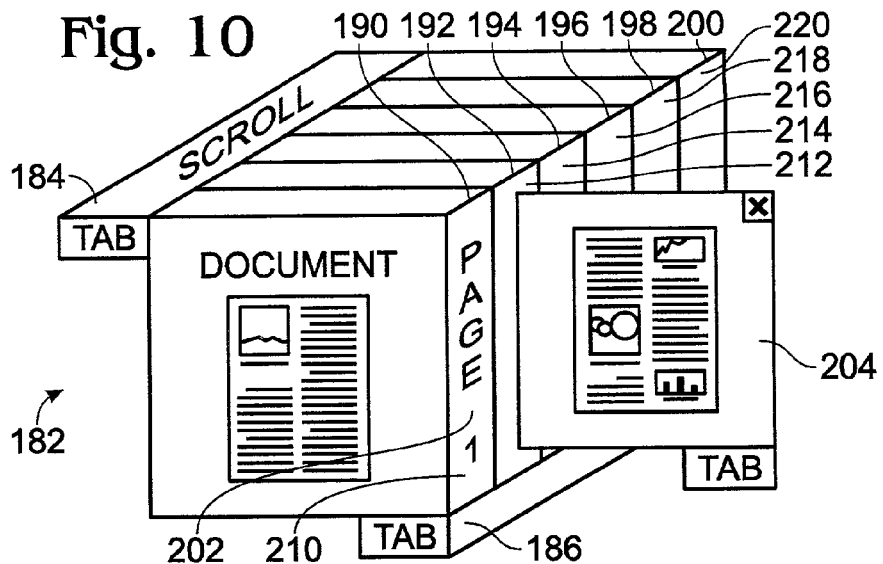
FIG. 10 shows an embodiment of the present invention displaying a page image and related elements.

Further features of embodiments of the present invention may be illustrated in reference to FIG. 10 which depicts multiple function icon 182. Icon 182 comprises a series of object images 190-200 which may represent document pages. Icon 182 may further comprise scroll bars 184 and 186. Object images 190-200 comprise edges 210-220 as in previously described embodiments. As also explained above, edges 210-220 may further comprise page indicia 202 which indicate which page within a document is currently represented by an object image. Page indicia 202 may comprise text or graphics which communicates the order or content of the page represented by the respective object image. Some embodiments will typically relate document page numbers.

Selection of an edge, such as edge 212, with a user input device, may activate a page inspection mode wherein the page represented by the selected edge is revealed as a thumbnail, miniature page, page indicia or some other page identifier on a page image 204. Page image 204 may comprise an actual image of the represented page in a reduced size or may comprise an element or portion of the page displayed at full size. Page image 204 may also comprise a description of the represented page or may simply display page indicia 202. Some embodiments of page image 204 may also comprise a summary of page information or an expression of document, file or other related data.

Once page image 204 has been revealed in a page inspection mode, page image 204 may be further selected for page modification and editing functions. For example, and not by way of limitation, the document page represented by page image 204 may be relocated to another position in a document by dragging page image 204 to a position proximate to another object image and dropping page image 204 at that location. This action will cause the page represented by object image 192 to be relocated at the location at which page image 204 is dropped. Other editing functions may also be performed on specific pages through similar operations. As another non-limiting example, the page represented by page image 204 may be deleted by dragging page image 204 away from icon 182 and dropping page image 204 at a location distal to icon 182. This same operation may be configured to remove the page represented by page image 204 from its document and create a new document comprising only that page. Other functions, including cutting, pasting, copying and others may be executed in a similar manner using embodiments of the present invention.

Figure 11:
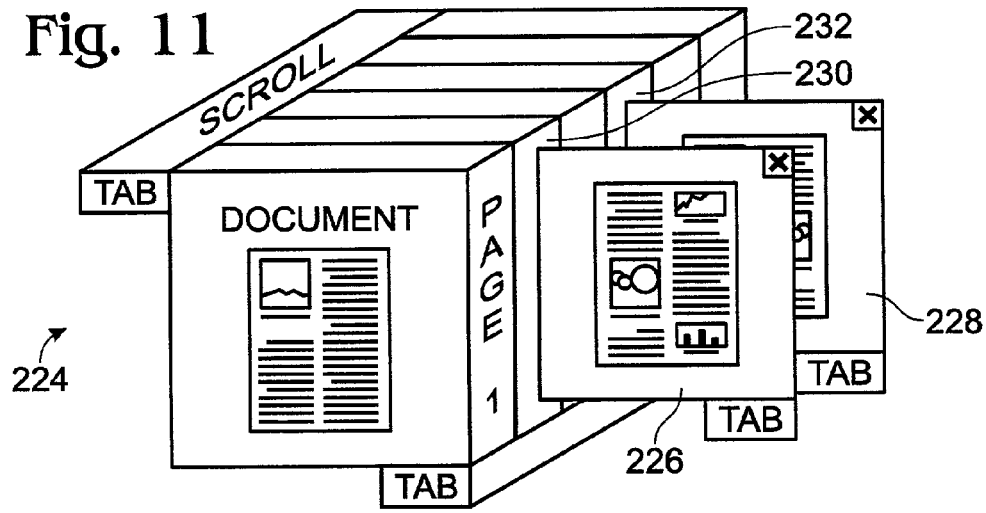
FIG. 11 shows an embodiment of the present invention displaying multiple page images.
Figure 12:
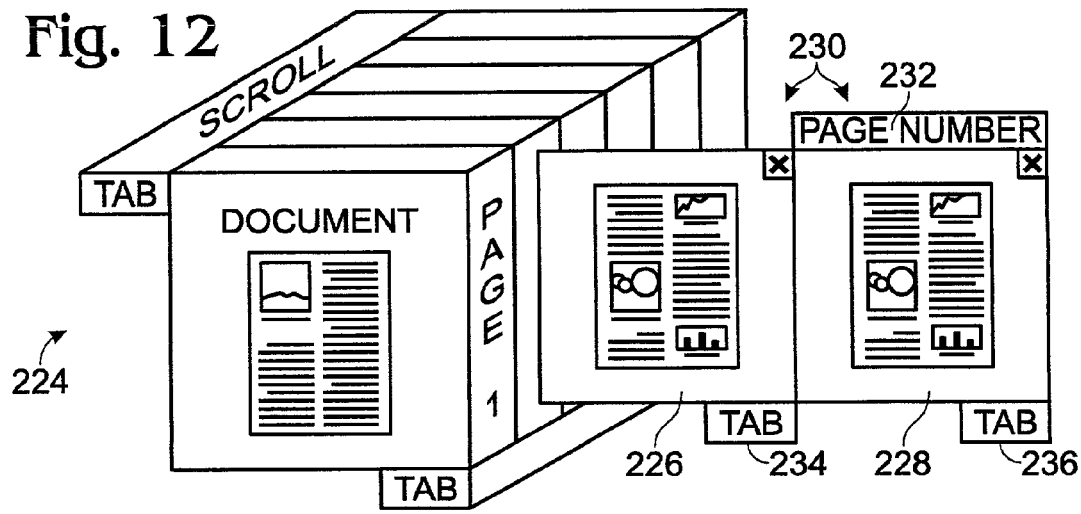
FIG. 12 shows an embodiment of the present invention displaying multiple page images in an adjacent series configuration.

Multiple page images may be placed in an inspection or editing mode through selection of corresponding object image edges in some embodiments of the present invention as shown in FIG. 11. Selection of object image edge 232 will cause page image 228 to be displayed. Further selection of object image edge 230 will cause page image 226 to be displayed. Once page images 226 and 228 are displayed, they may be dragged and dropped for modification and editing of the corresponding document. Once a page image 226 or 228 has been displayed or put in inspection mode, it may be retracted or removed from inspection mode by simple re-selection of the associated object image edge or active region.

Inspection of FIG. 11 will reveal that placing multiple pages into an inspection mode where multiple page images are displayed produces a view in which one or more page images are obscured by other page images in front of them. In FIG. 11, page image 228 is obscured or blocked by page image 226. When a user wishes to observe multiple page images in their entirety, a user may select a page image, such as page image 228 and drag the page image to a position adjacent to the page image which was blocking it. In an example, illustrated in FIGS. 11 and 12, page image 228 may be dragged to a position adjacent to page image 226 and dropped at that location. Embodiments of the present invention will detect the proximity of the page images to each other and automatically connect the page images into an adjacent series 230.

When page images are placed in an adjacent series configuration, the page images can no longer be identified by indicia placed on object image edges, therefore indicia tabs 232 may be automatically generated to help identify page images which are separated from object images. Page tabs 234 and 236 may also be generated for each page image to provide access to page data. Page tabs 234 and 236 may activate a page property sheet comprising page data such as page number, content or other information. Other functions may also be activated through selection of page tabs 234 and 236.

In reference to FIG. 13, an adjacent series configuration of some embodiments of the present invention may be illustrated. Multiple purpose icon 240 comprises object images 270-276 which may represent document pages as explained above. Selection of object edges, such as edge 278, may activate an inspection mode which displays a page image, such as a first page image 242, a second page image 244 or a third page image 246. Page images are initially connected to the object images from which they are selected, but may be re-oriented to an adjacent series configuration through drag and drop procedures as explained in conjunction with FIGS. 11 and 12 above. Page images 244 and 246 have been placed in position in such a manner. Indicia tabs 248 and 250 may be displayed automatically after page images 244 and 246 are re-positioned away from their object images.

In some embodiments, further navigation and editing features are enabled in an adjacent series configuration. Scroll tab 252 may be displayed to enable scrolling of pages displayed in page images. Arrow images 254 and 256 may be selected for scrolling back and forth through a document and displaying thumbnails or other page indicia on page images 242, 244, and 246. Additionally, scroll bar 260 and scroll tab 258 may be used to scroll through document pages.

Icon 240 may also be used to display print setting sheet 264 while in an adjacent series configuration. Print setting sheet 264 may be used to access current printer settings and selections. Print settings tab 266 may also be used in certain embodiments to access further printer-related functions such as print preview, printer selection or other functions.

Further document modification and editing functions of embodiments of the present invention may be explained in relation to the following figures and explanation.

Figure 14C:
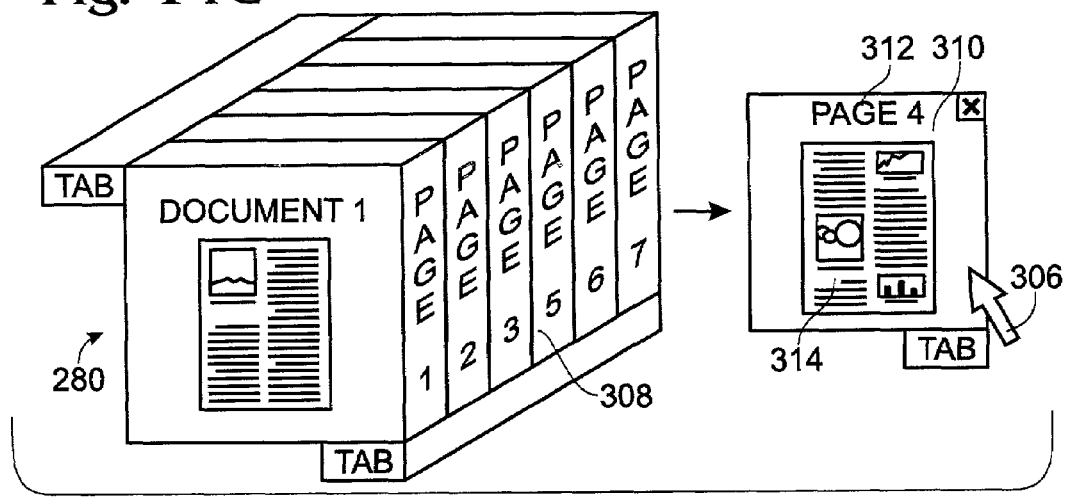
FIGS. 14 A-D show a process of an embodiment of the present invention in which document pages are removed via drag and drop methods.
Figure 14D:
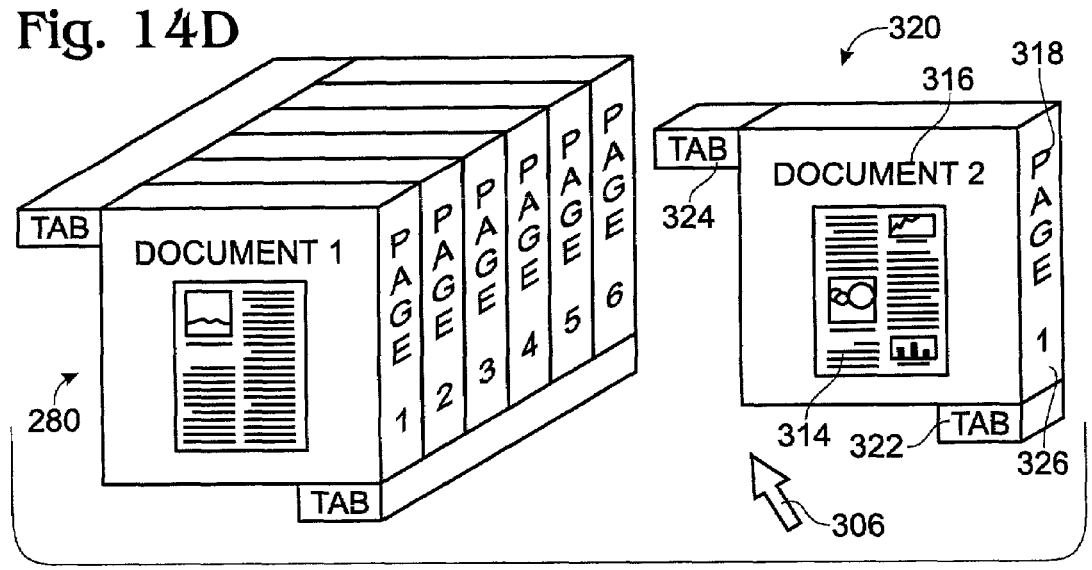

In reference to FIGS. 14A-14D, a page removal function may be explained wherein a page image 310, representing a document page, is dragged from a multi-function icon 280 thereby triggering a document page removal process. As shown in FIG. 14A, icon 280 is comprised of multiple object images 290-300 in an offset stack orientation. Each object image 290-300, such as object image 296, comprises a page indicia 304 which identifies a document page represented by an object image. Page indicia 304 indicates that object image edge 308 represents page 4 of the document represented by icon 280. Each object image edge may be selected with a pointing device cursor 306 using known selection and drag and drop methods.

When object image 308 is selected, as shown in FIG. 14B, page image 310 is displayed to further identify page details. Page details may be communicated through a thumbnail or page image 314 and/or through expanded page indicia 312 which may comprise text or other data which identifies page 4 of a first document represented by icon 280.

Once page image 310 is displayed, page image 310 may be removed from icon 280 by dragging page image 310 away from icon 280 with cursor 306 according to input device input, as shown in FIG. 14C. As page image 310 leaves the proximity of icon 280, page indicia associated with object images 290-300 may be updated to reflect a new status. Embodiments of icon 280 may automatically update to represent new document pages in the absence of page image 310 and the page, page 4, that it represents. As page image 310 is removed, the pages following page 4 may be moved into representation by object image 308 and subsequent object images. In the example illustrated in FIGS. 14A-14D, document page 5 moves from object image 298 into object image 296, document page 6 moves from object image 300 to object image 298 and previously unrepresented document page 7 moves into object image 300, thereby filling the void created by the removal of page 4. Page indicia 304 for object images 296-300 may be updated to reflect the new representation.

Page image 310 may now be dropped at a location distal to icon 280 thereby confirming a user's desire to separate document page 4 from its parent document. As page image 310 is dropped, it is converted to independent icon 320, shown in FIG. 14D, signifying that it now represents a separate document. Independent icon 320 comprises all the functionality of icon 280, but represents a different document which has been created through the removal of page 4 from a parent document. Independent icon 320 comprises function tabs 322 and 324 and bears page indicia 318 and document indicia 316. Independent icon 320 may further comprise a page representation 314 of the first page represented by icon 320. As with icon 280, icon 320 comprises an edge 326 which, when selected, will activate a page image similar to page image 310.

Document page sequencing functions may also be effectuated using embodiments of the present invention as shown in FIGS. 15A-15E. In reference to FIG. 15A, a multi-function icon 330 of an embodiment of the present invention comprises object images 380-390 as well as function tabs 332 and 334 which may provide scroll bar functionality. Object images 380-390 comprise side edges 340-350 and top edges 360-370. Side edges 340-350 may comprise page indicia 336 to indicate the document pages represented by each edge 340-350. Top edges 360-370 may also comprise page indicia 337 to identify represented pages. Frontmost object image 340 may also comprise document indicia 338 which identifies the document represented by icon 330. Frontmost object image 340 may also comprise a page image 339 comprising a thumbnail or other representation of the page represented by frontmost object image 340.

Figure 15A:
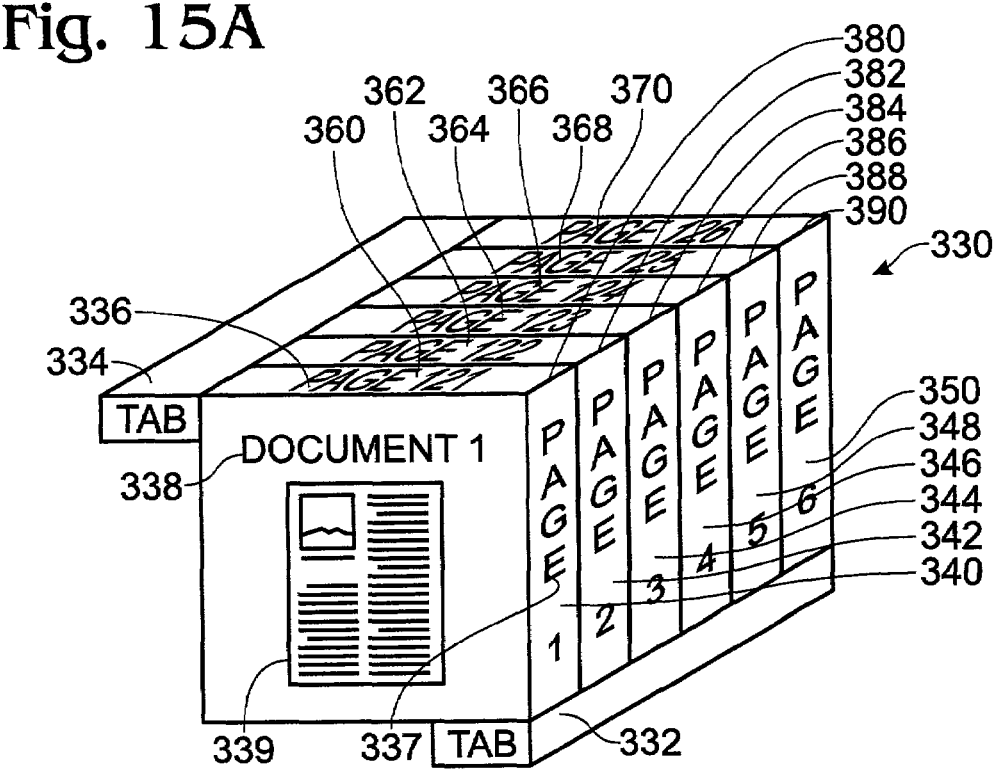
FIGS. 15 A-E show a process of an embodiment of the present invention in which pages are reordered.
Figure 15B:
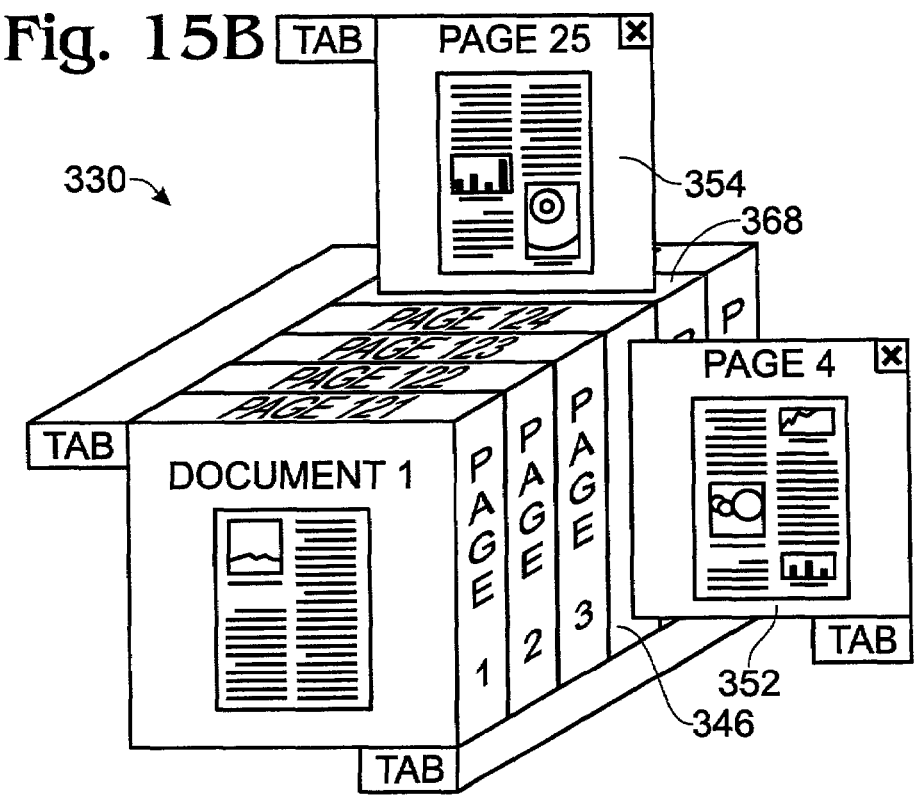

As previously described in other examples, icon 330 may be manipulated to display page images of each page of a document as shown in FIG. 15B. Selection of side edge 346 may cause page image 352 to be displayed. Similarly, selection of top edge 368 may cause page image 354 to be displayed.

Figure 15C:
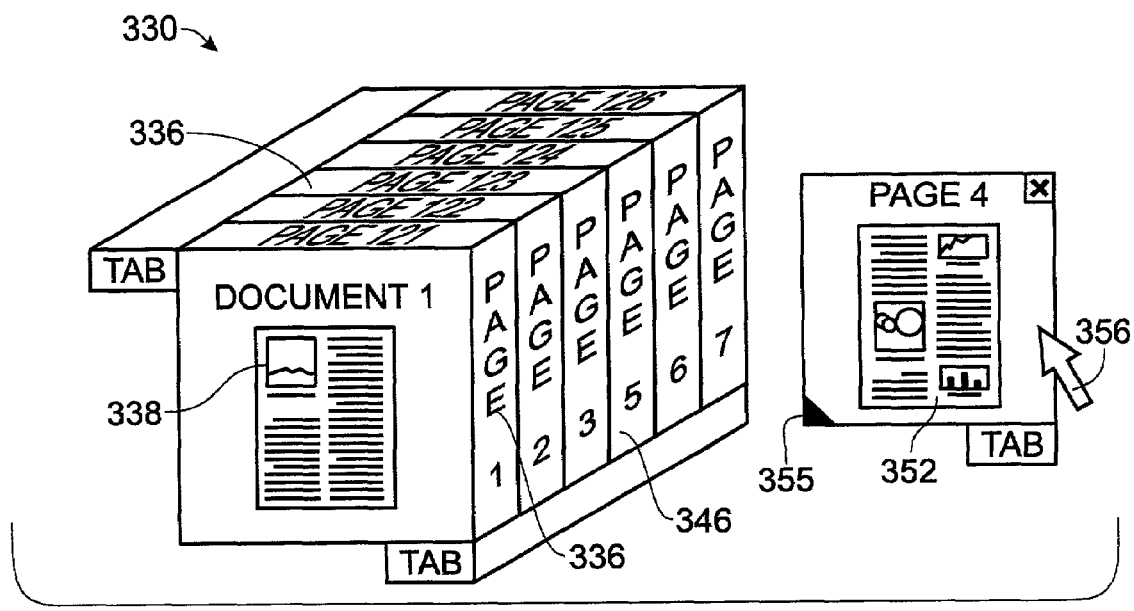

In reference to FIG. 15C, a page image 352 may be dragged away from icon 330 using pointing device input or some other control. When page image 352 reaches a certain distance from icon 330, embodiments of the present invention will recognize its absence and update page indicia 336 and object image display to indicate the change. In some embodiments, new document pages will be represented by object images 380-390 when a page image is removed. Typically, a page or pages following the sequence represented by the removed page will scroll into the vacancy created by the removed page and a page that was not previously represented will scroll into the sequence. Generally, page indicia 336 will continue to indicate page numbers or other status for the condition that existed before page removal, however a new page sequence or condition may be displayed at any time. When a removed page image becomes a new document, as in the page extraction example above, page indicia 336 may be updated to reflect a post-extraction page sequence.

Figure 15D:
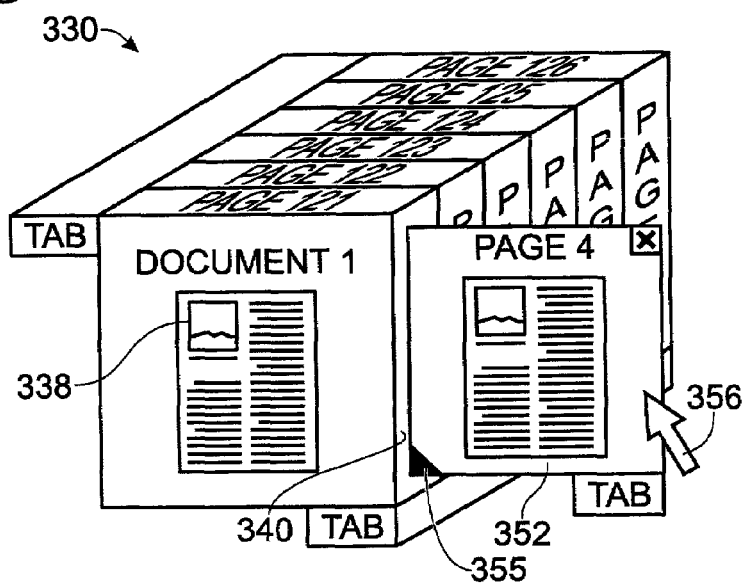

Once page image 352 has been dragged away from icon 330, page image 352 may be re-inserted into icon 330 at the same or a different location. Page image 352 may be dragged into another position on icon 330 thereby relocating the document page represented by page image 352. Generally, a part of page image 352, such as bottom left corner 355, will act as a pointer for indicating a new page location. To effect a typical page re-ordering procedure, page image 352 may be dragged using pointing device cursor 356. Page image 352 may be dragged such that corner 355 points to an edge 340-350 or 360-370. When corner 355 points to a specific edge, such as edge 340, as shown in FIG. 15D, page image 352 attaches to that edge 340 and the page previously represented by edge 340 as well as pages represented by adjacent edges 342-350 shift to accommodate insertion of page image 352. Page image 352 may be moved to a position among edges 340-350 or may be moved to a position among edges 360-370.

Figure 15E:
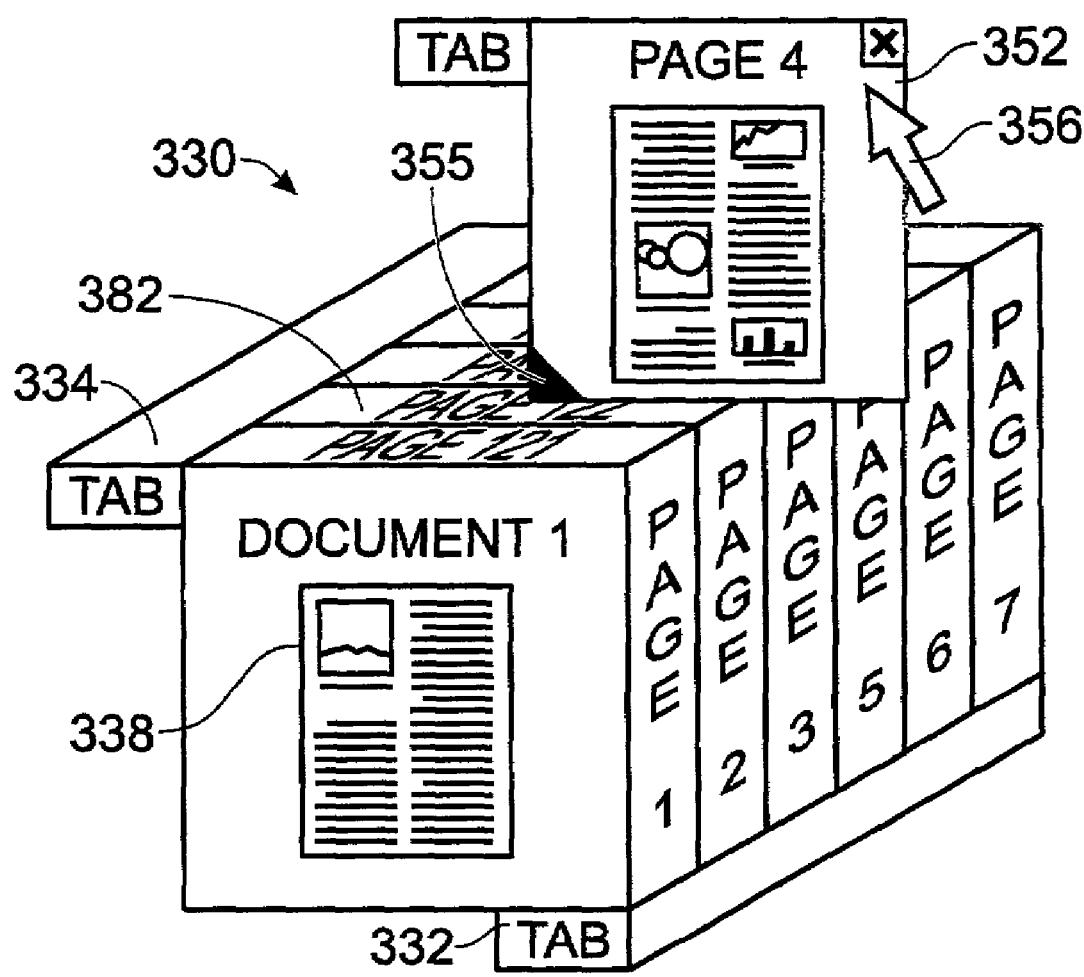

Because edges 360-370 may represent a range of document pages independent of the range represented by edges 340-350, pages may be moved from one range of a document to another without representing all pages between these ranges. For example, as shown in FIG. 15E, scroll bars 332 and 334 may be used to configure icon 330 to represent document pages 1-6 with edges 340-350 while edges 360-370 represent document pages 121 through 126. In this configuration, document page 4 may be removed by dragging page image 352 from edge 346 and placing document page 4 into a position in the document immediately after page 121 by locating corner 355 on edge 382 thereby attaching page image 352 to edge 382 causing automatic resequencing of pages. In this manner, any page in a document may be re-ordered or removed and pages may be added by dragging page images from one document icon to another.

Similarly, groups of pages may be selected and manipulated in the same manner as single pages thereby allowing reordering, extraction, deletion and other functions to be performed on multiple page sets. Sequential page sets that are larger than the number of object images may be selected by selecting a first object image edge associated with a first page then scrolling to the page at the other end of the sequence and while depressing a key, such as the shift key, selecting the object image edge associated with the final page in the sequence. Other methods may also be employed to select multiple page sets for manipulation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for manipulating a document, said system comprising:
   a) a page-indexed icon on a computing device display, wherein said page-indexed icon comprises:
      i) a plurality of page elements,
         wherein said plurality of page elements is arranged in offset, overlapped relation, wherein each of said plurality of page elements corresponds to a different page in a document,
         wherein said plurality of page elements comprises a first page element, said first page element comprising:
            a first side-edge element,
               wherein said first side-edge element comprises a first-side-edge active region capable of effectuating, in response to user input in said first-side-edge active region, the display, on said computing device display, of a first page image associated with a first page in said document, said first page corresponding to said first page element, thereby producing a displayed first page image, said displayed first page image protruding from said first side-edge element,
               wherein said first page image comprises a first-page-image tab, wherein said first-page-image tab comprises a first-image-tab active region, said first-image-tab active region capable of effectuating the display, on said computing device display, of a first-page-element-properties image,
               wherein said first-page-element-properties image comprises a graphical representation of at least one property of said first page in said document,
               wherein said first side-edge element further comprises a first page index indicating the page number associated with said first page in said document,
         wherein said plurality of page elements further comprises a second page element, said second page element comprising:
            a second side-edge element,
               wherein said second side-edge element comprises a second-side-edge active region capable of effectuating, in response to user input in said second-side-edge active region, the display, on said computing device display, of a second page image associated with a second page in said document, said second page corresponding to said second page element, thereby producing a displayed second page image, said displayed second page image protruding from said second side-edge element,
               wherein said second page image comprises a second-page-image tab, wherein said second-page-image tab comprises a second-image-tab active region, said second-image-tab active region capable of effectuating the display, on said computing device display, of a second-page-element-properties image, wherein said second-page-element-properties image comprises a graphical representation of at least one property of said second page in said document,
               wherein said displayed second page image is further capable of moving, on said computing device display, in response to user input, wherein when said displayed second page image is moved to a location on said computing device display substantially near to said displayed first page image, said displayed second page image is displayed adjacent to said displayed first page image, thereby producing an adjacent series of page images,
                  wherein said adjacent series of page images further comprises a scroll-bar element,
                  wherein said adjacent series of page images further comprises an arrow element,
               wherein said second side-edge element further comprises a second page index indicating the page number associated with said second page in said document,
      ii) said page-indexed icon further comprising a first tab element, wherein said first tab element comprises a first-tab-element active region, said first-tab-element active region capable of activating the display, on said computing device display, of a print-settings image in response to user input in said first-tab-element active region, wherein said print-settings image comprises a representation of a plurality of print settings associated with said document, wherein said display of a print-settings image is in a region, on said computing device display, substantially proximate to said first tab element, and
      iii) said page-indexed icon further comprising a second tab element, wherein said second tab element comprises a second-tab-element active region, said second-tab-element active region capable of activating the display, on said computing device display, of a document-properties image in response to user input in said second-tab-element active region, wherein said document-properties image comprises a representation of a plurality of document properties associated with said document, wherein said display of a document-properties image is in a region, on said computing device display, substantially proximate to said second tab element.

2. A system according to claim 1, wherein said displayed first page image comprises recognizable portions of said first page in said document.

3. A system according to claim 1, wherein said displayed second page image comprises recognizable portions of said second page in said document.

4. A method for manipulating a document, said method comprising:
   a) displaying a page-indexed icon on a computing device display, wherein said page-indexed icon comprises:
      i) a plurality of page elements,
         wherein said plurality of page elements is arranged in offset, overlapped relation, wherein each of said plurality of page elements corresponds to a different page in a document, wherein said plurality of page elements comprises a first page element, said first page element comprising:
a first side-edge element,
wherein said first side-edge element comprises a first-side-edge active region capable of effectuating, in response to user input in said first-side-edge active region, the display, on said computing device display, of a first page image associated with a first page in said document, said first page corresponding to said first page element, thereby producing a displayed first page image, said displayed first page image protruding from said first side-edge element,
wherein said first page image comprises a first-page-image tab, wherein said first-page-image tab comprises a first-image-tab active region, said first-image-tab active region capable of effectuating the display, on said computing device display, of a first-page-element-properties image, wherein said first-page-element-properties image comprises a graphical representation of at least one property of said first page in said document,
wherein said first side-edge element further comprises a first page index indicating the page number associated with said first page in said document,
wherein said plurality of page elements further comprises a second page element, said second page element comprising:
a second side-edge element,
wherein said second side-edge element comprises a second-side-edge active region capable of effectuating, in response to user input in said second-side-edge active region, the display, on said computing device display, of a second page image associated with a second page in said document, said second page corresponding to said second page element, thereby producing a displayed second page image, said displayed second page image protruding from said second side-edge element,
wherein said second page image comprises a second-page-image tab, wherein said second-page-image tab comprises a second-image-tab active region, said second-image-tab active region capable of effectuating the display, on said computing device display, of a second-page-element-properties image, wherein said second-page-element-properties image comprises a graphical representation of at least one property of said second page in said document,
wherein said displayed second page image is further capable of moving, on said computing device display, in response to user input, wherein when said displayed second page image is moved to a location on said computing device display substantially near to said displayed first page image, said displayed second page image is displayed adjacent to said displayed first page image, thereby producing an adjacent series of page images,
wherein said adjacent series of page images further comprises a scroll-bar element,
wherein said adjacent series of page images further comprises an arrow element, wherein said second side-edge element further comprises a second page index indicating the page number associated with said second page in said document,
ii) said page-indexed icon further comprising a first tab element, wherein said first tab element comprises a first-tab-element active region, said first-tab-element active region capable of activating the display, on said computing device display, of a print-settings image in response to user input in said first-tab-element active region, wherein said print-settings image comprises a representation of a plurality of print settings associated with said document, wherein said display of a print-settings image is in a region, on said computing device display, substantially proximate to said first tab element, and
iii) said page-indexed icon further comprising a second tab element, wherein said second tab element comprises a second-tab-element active region, said second-tab-element active region capable of activating the display, on said computing device display, of a document-properties image in response to user input in said second-tab-element active region, wherein said document-properties image comprises a representation of a plurality of document properties associated with said document, wherein said display of a document-properties image is in a region, on said computing device display, substantially proximate to said second tab element.

5. A method according to claim 4, wherein said displayed first page image comprises recognizable portions of said first page in said document.

6. A method according to claim 4, wherein said displayed second page image comprises recognizable portions of said second page in said document.

7. A system for manipulating a document, said system comprising:
a) a page-indexed icon on a computing device display, wherein said page-indexed icon comprises:
i) a plurality of page elements,
wherein said plurality of page elements comprises a plurality of side page-elements,
wherein said plurality of side page-elements is arranged in offset relation, thereby producing a side-portion of a graphical representation of a cube,
wherein each of said plurality of side page-elements corresponds to a different page in a first sub-sequence of consecutive pages in a document,
wherein said plurality of side page-elements comprises:
a first side page-element,
wherein said first side page-element comprises a first-side-page-element active region capable of effectuating, in response to user input in said first-side-page-element active region, the display, on said computing device display, of a first side-page image associated with a first side page in said document, said first side page corresponding to said first side page-element, thereby producing a displayed first side-page image, said displayed first side-page image protruding from said first side page-element,
wherein said first side-page image comprises a first-side-page-image tab, wherein said first-side-page-image tab comprises a first-side-image-tab active region, said first-side-image-tab active region capable of effectuating the display, on said computing device display, of a first-side-page-element-properties image, wherein said first-side-page-element-properties image comprises a graphical representation of at least one property of said first side-page in said document, wherein said first side page-element further comprises a first page index indicating the page number associated with said first side-page in said document, wherein said plurality of page elements further comprises a plurality of top page-elements, wherein said plurality of top page-elements is arranged in offset relation, thereby producing a top-portion of said graphical representation of a cube, wherein each of said plurality of top page-elements corresponds to a different page in a second subsequence of consecutive pages in said document, wherein said plurality of top page-elements comprises:

a first top page-element, wherein said first top page-element comprises a first-top-page-element active region capable of effectuating, in response to user input in said first-top-page-element active region, the display, on said computing device display, of a first top-page image associated with a first top-page in said document, said first top-page corresponding to said first top page-element, thereby producing a displayed first top-page image, said displayed first top-page image protruding from said first top-page-element, wherein said first top-page image comprises a first-top-page-image tab, wherein said first-top-page-image tab comprises a first-top-image-tab active region, said first-top-image-tab active region capable of effectuating the display, on said computing device display, of a first-top-page-element-properties image, wherein said first-top-page-element-properties image comprises a graphical representation of at least one property of said first top-page in said document, wherein said first top-page-element further comprises a first top-page index indicating the page number associated with said first top page in said document.

8. A system according to claim 7, wherein said displayed first side-page image comprises recognizable portions of said first side-page in said document.

9. A system according to claim 7, wherein said displayed first top-page image comprises recognizable portions of said first top-page in said document.

10. A system according to claim 7, wherein said page-indexed icon further comprises a first tab element, wherein said first tab element comprises a first-tab-element active region, said first-tab-element active region capable of activating the display, on said computing device display, of a print-settings image in response to user input in said first-tab-element active region, wherein said print-settings image comprises a representation of a plurality of print settings associated with said document; wherein said display of a print-settings image is in a region, on said computing device display, substantially proximate to said first tab element.

11. A system according to claim 7, wherein said page-indexed icon further comprising a second tab element, wherein said second tab element comprises a second-tab-element active region, said second-tab-element active region capable of activating the display, on said computing device display, of a document-properties image in response to user input in said second-tab-element, wherein said document-properties image comprises a representation of a plurality of document properties associated with said document, wherein said display of a document-properties image is in a region, on said computing device display, substantially proximate to said second tab element.

12. A system according to claim 7, wherein said displayed first top-page image is further capable of moving, on said computing device display, in response to user input, wherein when said displayed first top-page image is moved to a location on said computing device display substantially near to said displayed first side-page image, said displayed first top-page image is displayed adjacent to said displayed first side-page image, thereby producing an adjacent series of page images, wherein said adjacent series of page images further comprises a scroll-bar element, wherein said adjacent series of page images further comprises an arrow element.

13. A system according to claim 7, wherein said displayed first side-page image is further capable of moving, on said computing device display, in response to user input, wherein when said displayed first side-page image is moved to a location on said computing device display substantially near to said displayed first top-page image, said displayed first side-page image is displayed adjacent to said displayed first top-page image, thereby producing an adjacent series of page images, wherein said adjacent series of page images further comprises a scroll-bar element, wherein said adjacent series of page images further comprises an arrow element.

14. A method for manipulating a document, said method comprising:

a) displaying a page-indexed icon on a computing device display, wherein said page-indexed icon comprises:

i) a plurality of page elements, wherein said plurality of page elements comprises a plurality of side page-elements, wherein said plurality of side page-elements is arranged in offset relation, thereby producing a side-portion of a graphical representation of a cube, wherein each of said plurality of side page-elements corresponds to a different page in a first subsequence of consecutive pages in a document, wherein said plurality of side page-elements comprises:

a first side page-element, wherein said first side page-element comprises a first-side-page-element active region capable of effectuating, in response to user input in said first-side-page-element active region, the display, on said computing device display, of a first side-page image associated with a first side page in said document, said first side page corresponding to said first side page-element, thereby producing a displayed first side-page image, said displayed first side-page image protruding from said first side page-element, wherein said first side-page image comprises a first-side-page-image tab, wherein said first-side-page-image tab comprises a first-side-image-tab active region, said first-side-image-tab active region capable of effectuating the display, on said computing device display, of a first-side-page-element-properties image, wherein said first-side-page-element-properties image comprises a graphical representation of at least one property of said first side-page in said document, wherein said first side page-element further comprises a first page index indicating the page number associated with said first side-page in said document, wherein said plurality of page elements further comprises a plurality of top page-elements, wherein said plurality of top page-elements is arranged in offset relation, thereby producing a top-portion of said graphical representation of a cube, wherein each of said plurality of top page-elements corresponds to a different page in a second subsequence of consecutive pages in said document, wherein said plurality of top page-elements comprises:

a first top page-element, wherein said first top page-element comprises a first-top-page-element active region capable of effectuating, in response to user input in said first-top-page-element active region, the display, on said computing device display, of a first top-page image associated with a first top-page in said document, said first top-page corresponding to said first top page-element, thereby producing a displayed first top-page image, said displayed first top-page image protruding from said first top-page-element, wherein said first top-page image comprises a first-top-page-image tab, wherein said first-top-page-image tab comprises a first-top-image-tab active region, said first-top-image-tab active region capable of effectuating the display, on said computing device display, of a first-top-page-element-properties image, wherein said first-top-page-element-properties image comprises a graphical representation of at least one property of said first top-page in said document, wherein said first top-page-element further comprises a first top-page index indicating the page number associated with said first top page in said document.

15. A method according to claim 14, wherein said displayed first side-page image comprises recognizable portions of said first side-page in said document.

16. A method according to claim 14, wherein said displayed first top-page image comprises recognizable portions of said first top-page in said document.

17. A method according to claim 14, wherein said page-indexed icon further comprises a first tab element, wherein said first tab element comprises a first-tab-element active region, said first-tab-element active region capable of activating the display, on said computing device display, of a print-settings image in response to user input in said first-tab-element active region, wherein said print-settings image comprises a representation of a plurality of print settings associated with said document; wherein said display of a print-settings image is in a region, on said computing device display, substantially proximate to said first tab element.

18. A method according to claim 14, wherein said page-indexed icon further comprising a second tab element, wherein said second tab element comprises a second-tab-element active region, said second-tab-element active region capable of activating the display, on said computing device display, of a document-properties image in response to user input in said second-tab-element, wherein said document-properties image comprises a representation of a plurality of document properties associated with said document, wherein said display of a document-properties image is in a region, on said computing device display, substantially proximate to said second tab element.

19. A method according to claim 14, wherein said displayed first top-page image is further capable of moving, on said computing device display, in response to user input, wherein when said displayed first top-page image is moved to a location on said computing device display substantially near to said displayed first side-page image, said displayed first top-page image is displayed adjacent to said displayed first side-page image, thereby producing an adjacent series of page images, wherein said adjacent series of page images further comprises a scroll-bar element, wherein said adjacent series of page images further comprises an arrow element.

20. A method according to claim 14, wherein said displayed first side-page image is further capable of moving, on said computing device display, in response to user input, wherein when said displayed first side-page image is moved to a location on said computing device display substantially near to said displayed first top-page image, said displayed first side-page image is displayed adjacent to said displayed first top-page image, thereby producing an adjacent series of page images, wherein said adjacent series of page images further comprises a scroll-bar element, wherein said adjacent series of page images further comprises an arrow element.

* * * * *